(12) United States Patent
Rowland et al.

(10) Patent No.: US 6,939,122 B2
(45) Date of Patent: Sep. 6, 2005

(54) FLUIDIZER FOR A SUBSTANCE

(75) Inventors: Roderick Rowland, Fairfax, VA (US); Tony F. Zahrah, Fairfax, VA (US)

(73) Assignee: Matsys, Springfield, VA (US)

( * ) Notice: Subject to any disclaimer, the term of this patent is extended or adjusted under 35 U.S.C. 154(b) by 27 days.

(21) Appl. No.: 10/767,202

(22) Filed: Jan. 30, 2004

(65) Prior Publication Data

US 2004/0184891 A1 Sep. 23, 2004

Related U.S. Application Data

(62) Division of application No. 10/208,262, filed on Jul. 31, 2002, now abandoned.

(51) Int. Cl.[7] .................................. A01J 21/00
(52) U.S. Cl. ..................... 425/448; 425/445; 141/67; 406/198
(58) Field of Search ................ 425/448, 449; 141/67; 406/198

(56) References Cited

U.S. PATENT DOCUMENTS

| | | | |
|---|---|---|---|
| 1,759,983 A | | 5/1930 | Houston |
| 2,797,715 A | * | 7/1957 | Triteline ................... 141/67 |
| 3,176,369 A | | 4/1965 | Dennis et al. |
| 3,647,333 A | | 3/1972 | Smith |
| 3,788,787 A | | 1/1974 | Silbereisen et al. |
| 3,832,107 A | | 8/1974 | Cox et al. |
| 3,995,771 A | | 12/1976 | Olivier |
| 4,083,607 A | * | 4/1978 | Mott ........................ 406/171 |
| 4,591,324 A | | 5/1986 | Kubota |
| 4,599,215 A | | 7/1986 | Smarsly et al. |
| 4,730,936 A | | 3/1988 | Thorjusen |
| 4,841,884 A | | 6/1989 | Engstrom et al. |
| 4,859,073 A | | 8/1989 | Howseman, Jr. et al. |
| 4,934,569 A | | 6/1990 | Womack et al. |
| 4,970,804 A | | 11/1990 | Hüttlin |
| 5,000,624 A | | 3/1991 | Steiger |
| 5,017,754 A | | 5/1991 | Drouet et al. |
| 5,096,096 A | | 3/1992 | Calaunan |
| 5,143,486 A | | 9/1992 | Geoffroy |
| 5,213,816 A | | 5/1993 | Smyth, Jr. et al. |
| 5,400,921 A | | 3/1995 | Smith, Jr. et al. |
| 5,469,994 A | | 11/1995 | Reh et al. |
| 5,562,369 A | | 10/1996 | Jones |
| 5,615,830 A | | 4/1997 | Matsunaga et al. |
| 5,722,802 A | | 3/1998 | March |
| 5,775,389 A | * | 7/1998 | Griffin ...................... 141/325 |
| 6,371,332 B1 | | 4/2002 | Fox |
| 6,402,500 B1 | | 6/2002 | Zahrah et al. |
| 6,485,284 B1 | | 11/2002 | Rowland et al. |
| 6,623,233 B2 | | 9/2003 | Peveling |
| 6,668,874 B2 | * | 12/2003 | Rowland et al. ............ 141/4 |

* cited by examiner

*Primary Examiner*—Joseph A. Dillon, Jr.
(74) *Attorney, Agent, or Firm*—Millen White Zelano & Branigan, P.C.

(57) ABSTRACT

The present invention generally relates to a fluidizer including at least one wall forming a conduit for a gas. The at least one wall may include a material having microscopic holes therein with a sufficient porosity to permit the escape of the gas through the microscopic holes to gas a substance. The present invention may also relate to a fluidizer including a non-cylindrical shape for fluidizing a particulate substance. The fluidizer can include a body at least partially positioned within a flow of the particulate substance wherein at least some of the particulate substance flows around the body.

17 Claims, 10 Drawing Sheets

FLUIDIZER FOR A SUBSTANCE

This application is a divisional application of U.S. patent application Ser. No. 10/208,262, filed Jul. 31, 2002 abandon. This application also relates to application Ser. No. 09/418,502, filed on Oct. 15, 1999; application Ser. No. 08/964,128 filed Nov. 6, 1997; and U.S. application Ser. No. 09/688,168, filed Oct. 16, 2000. The subject matter of all of these applications in their entirety is hereby incorporated by reference.

BACKGROUND

The invention generally relates to a fluidizer for a substance for gassing, preferably aerating, a liquid or fluidizing a particulate substance, such as a powder. Such fluidizers may include a material having microscopic holes to permit the escape of a gas for fluidizing, or may include a non-cylindrical shape and include a body at least partially positioned within a flow of a particulate substance.

Generally, the invention also relates to techniques and apparatuses for consistently and uniformly transporting and delivering particulate substances such as powders. Such transport and delivery systems can be used for filling cavities such as in die-casting machines prior to powder compaction in processes for fabricating consolidated parts for automotive, aerospace, micro-electronics, vitamins, pharmaceuticals, and the like. Particulates such as powders are typically fed from a main hopper and transferred through a tube to a feed or fill shoe which deposits the particulates into a die cavity by gravity or pressure.

However, prior art fluidizers suffer several disadvantages. One disadvantage is that these fluidizers are made from inflexible materials. As a result, they are not readily transformable into suitable shapes for a desired application. Consequently, if a fluidizer is desirable for a particular application, it must be carefully designed so as to be in the proper shape for installation. There is no ability to adjust the fluidizer should it not be suitably designed for the application, or if it is desired to modify the fluidizer for another application or to another device.

Another disadvantage typically associated with fluidizers is that they have more than one inlet connection for receiving a fluid, such as a gas, for fluidizing a substance. As a result, multiple inlet connections provide more opportunities for leaks to develop and these fluidizers may have greater maintenance costs.

In addition, there are several problems associated with prior art processes for powder delivery and filling of die cavities especially die cavities for high-precision, small parts. One such problem is a variation or inconsistency in powder flow in the tube connecting a main hopper or powder supply to a feed shoe on a die surface of a die casting machine. Clumping and surging of the particulates within the tubing and/or the feed shoe also contribute to the non-uniform filling of die cavities. Mechanical shaking of the feed structure above the die cavity can reduce clumping in the powder and improve fill uniformity, but such shaking is not necessarily consistent during successive filling operations. Moreover, such shaking causes segregation of fine materials from coarse materials which results in a loss of uniformity in particle-size distribution and chemical composition.

SUMMARY

One preferred embodiment of the present invention is a fluidizer that may include at least one wall forming a conduit for a gas. The at least one wall may further include a material having microscopic holes therein with a sufficient porosity to permit the escape of the gas through the microscopic holes to fluidize a substance.

Another embodiment of the present invention is a fluidizer that may have a non-cylindrical shape for fluidizing a particulate substance. The fluidizer may include a body at least partially positioned within a flow of the particulate substance where at least some of the particulate substance flows around the body.

A still further preferred embodiment of the present invention is a fluidizer that may include a material having a molecular weight over one million and a porosity sufficient to permit the escape of a gas to fluidize a substance.

DESCRIPTION OF THE DRAWINGS

FIG. 1—is a perspective view of an exemplary fluidizer of the present invention.

FIG. 2—is a perspective view of an exemplary embodiment of a cross-shaped fluidizer of the present invention.

FIG. 3—is a perspective view of an exemplary embodiment of a curvature-shaped fluidizer of the present invention.

FIG. 4—is a perspective view of an exemplary embodiment of an offset zig-zag-shaped fluidizer of the present invention.

FIG. 5—is a perspective view of an exemplary embodiment of a spiral-funnel-shaped fluidizer according to the present invention.

FIG. 6—is a perspective view of an exemplary embodiment of an apparatus according to the present invention.

FIG. 7—is a cut away, side view of an exemplary apparatus according to the present invention.

FIG. 8—is a bottom, perspective view of an exemplary embodiment of another apparatus according to the present invention.

FIG. 9—is a perspective view of an exemplary fluidizer according to the present invention positioned in a frame.

FIG. 10—is a perspective view of an exemplary fluidizer according to the present invention gassing a liquid.

FIG. 11—is a perspective view of an exemplary fluidizer according to the present invention fluidizing a particulate material in a funnel.

FIG. 12—is a perspective view of a plurality of fluidizers according to the present invention positioned within an opening for fluidizing a substance.

FIG. 13—is a perspective view of an exemplary embodiment of a non-cylindrical shaped fluidizer for, e.g., a round opening.

FIG. 14—is a perspective view of an exemplary embodiment of a non-cylindrical shaped fluidizer for, e.g., a rectangular opening.

DESCRIPTION OF THE PREFERRED EMBODIMENTS

Referring to FIG. 1, a fluidizer 100 may include at least one wall 114. The wall 114 forms a conduit 140 for a gas. Generally, the gas may be at least one inert gas, such as nitrogen or argon, or one or more other gases, such as air. Optionally, the fluidizer 100, in some embodiments, may also include a support 150, described in further detail hereinafter. Further optionally, an adapter 440 may attach to a single connection 410 of the fluidizer 100. A gas 420 may travel through the adapter 440, through a single inlet 400, and through the conduit 140 of the fluidizer 100. As used herein, the terms "to gas" and "gassing" mean to supply a gas to a substance.

Figure 7:
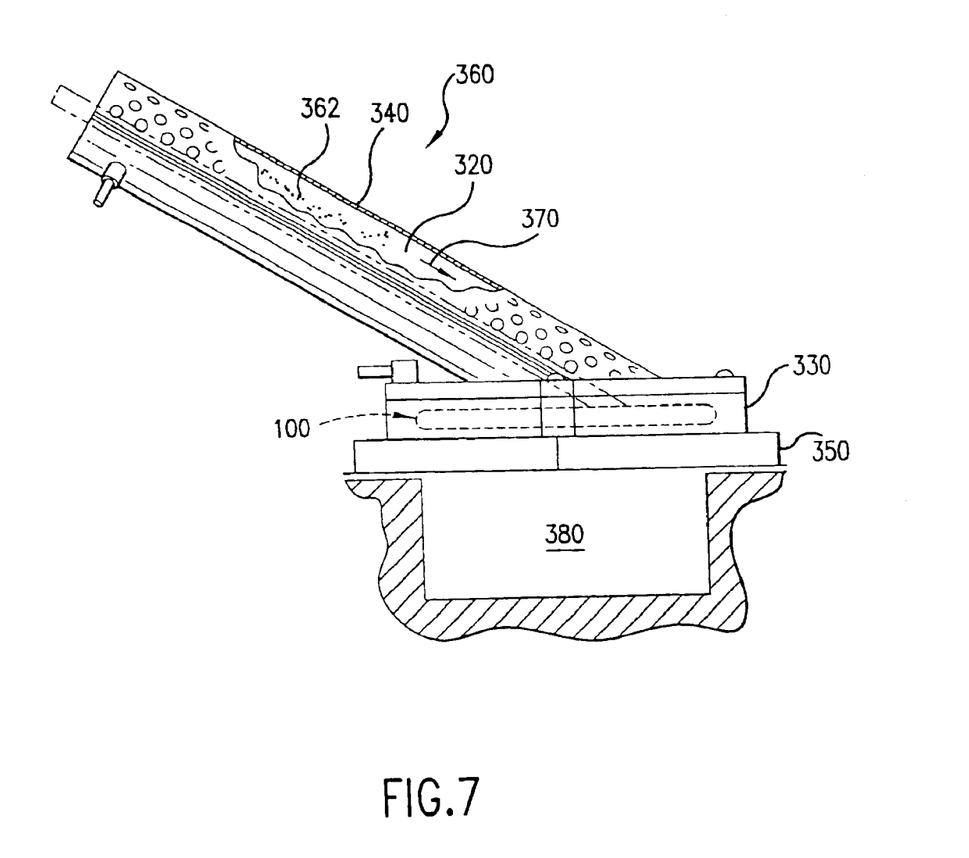

The fluidizer 100 may also include a material 118 having microscopic holes therein with a sufficient porosity to permit the escape of the gas 420 through the microscopic holes to fluidize a substance, such as a substance 360 depicted in FIG. 7. Generally, the material may have a porosity up to 50 microns, up to 40 microns, less than 10 microns, or preferably 0.5–10 microns.

The material 118 may be a plastic, or preferably a thermoplastic.

In one preferred embodiment, the material is a polyolefin, and preferably a polyethylene. The material 118 generally has a molecular weight over 1,000,000, a molecular weight of 2,000,000, or a molecular weight of 3,000,000–6,000,000. If the material has a molecular weight over 1,000,000, over 2,000,000, or of 3,000,000–6,000,000, preferably the material 118 is a polyethylene. More preferably, the material 118 is an ultra high molecular weight polyethylene with a molecular weight of about 3,000,000–6,000,000.

One preferred ultra high molecular weight polyethylene may be obtained from GenPore® a division of General Polymeric Corporation at 1136 Morgantown Rd., Reading, Pa. 19607.

Another embodiment of a fluidizer 100 of the present invention may have a non-cylindrical shape 210 (e.g. FIGS. 2–5 and 13–14) for fluidizing a particulate substance such as a particulate substance 362 in FIG. 7.

Figure 1:
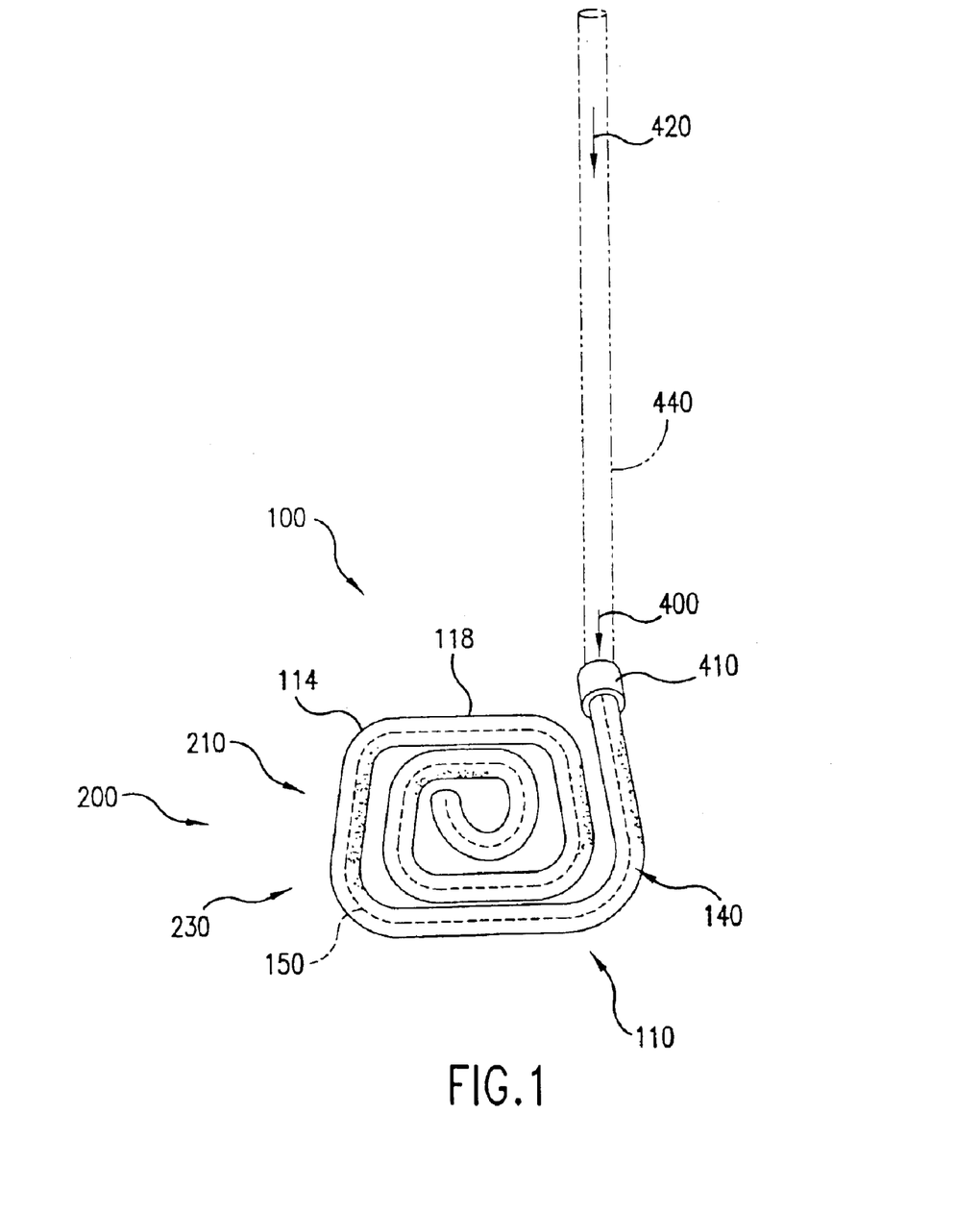
Figure 2:
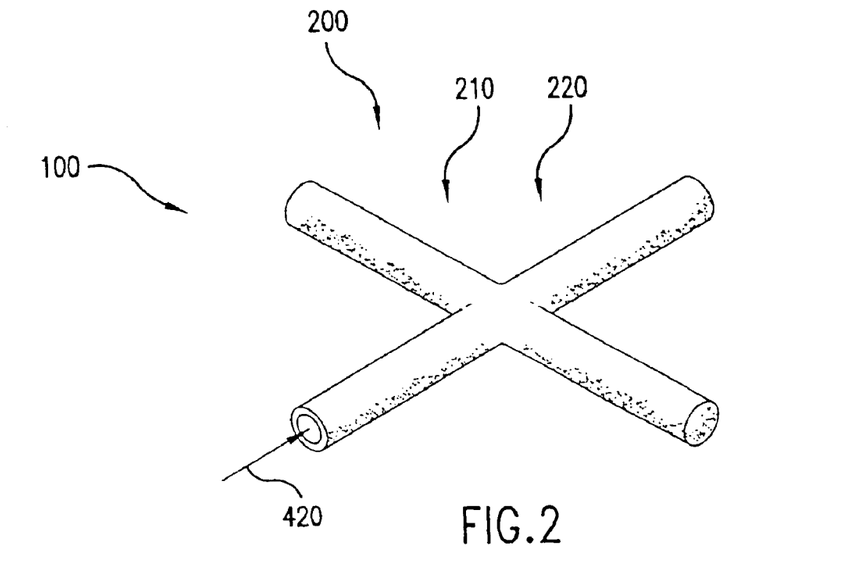
Figure 3:
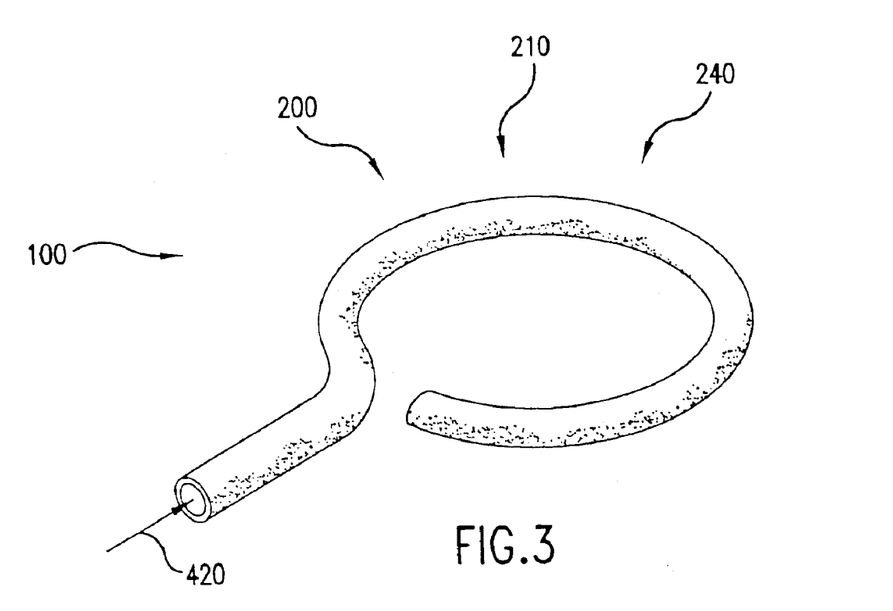
Figure 4:
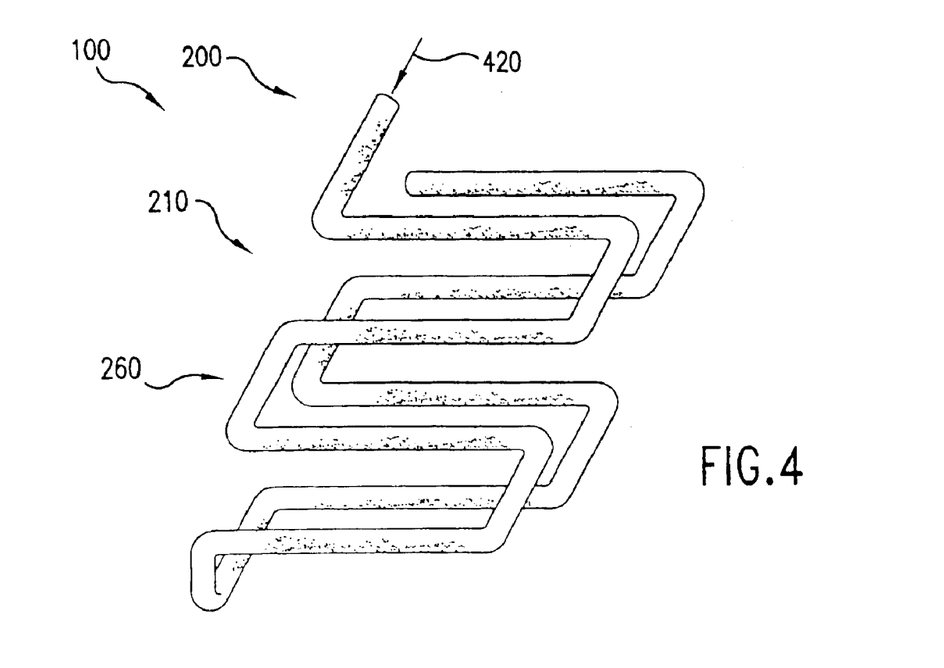
Figure 5:
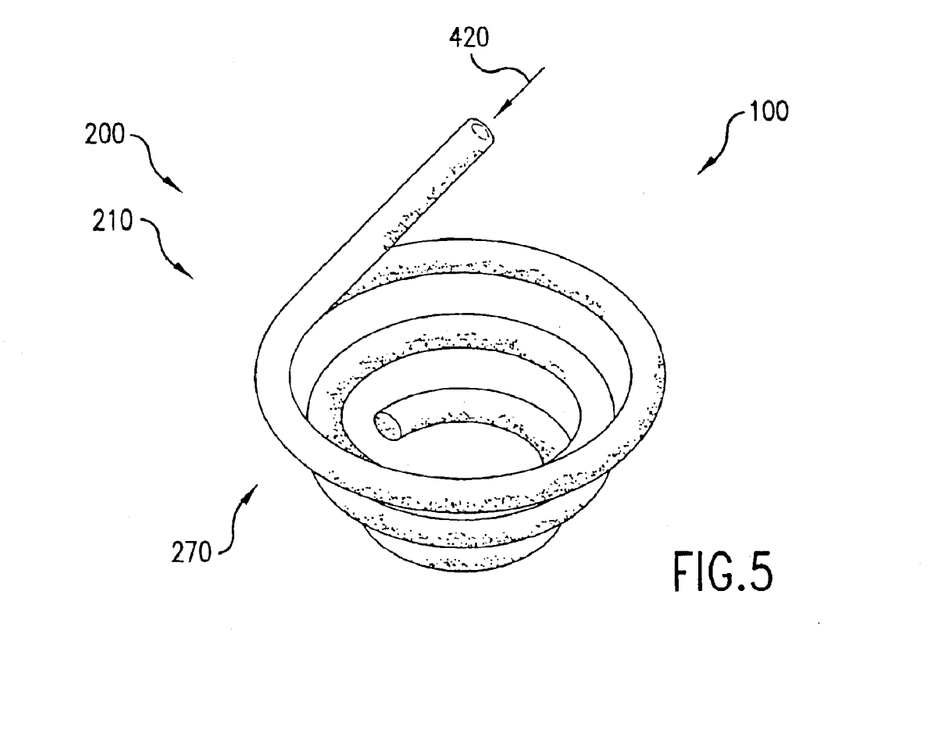

Referring to FIGS. 1 and 7, the fluidizer 100 may include a body 110 at least partially positioned within a flow 370 of the particulate substance 362 where at least some of the particulate substance 362 flows around the body 110. The body 110 may include the material 118 described above.

Figure 13:
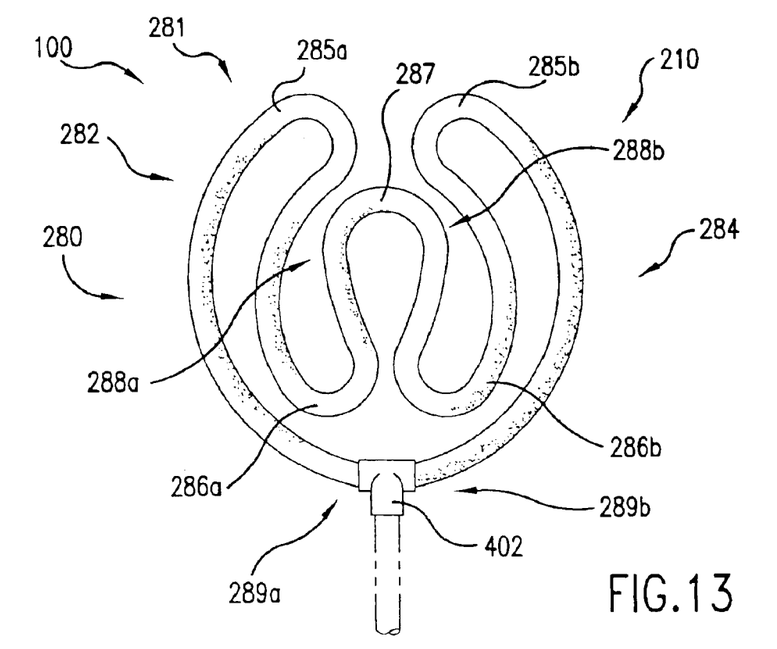
Figure 14:
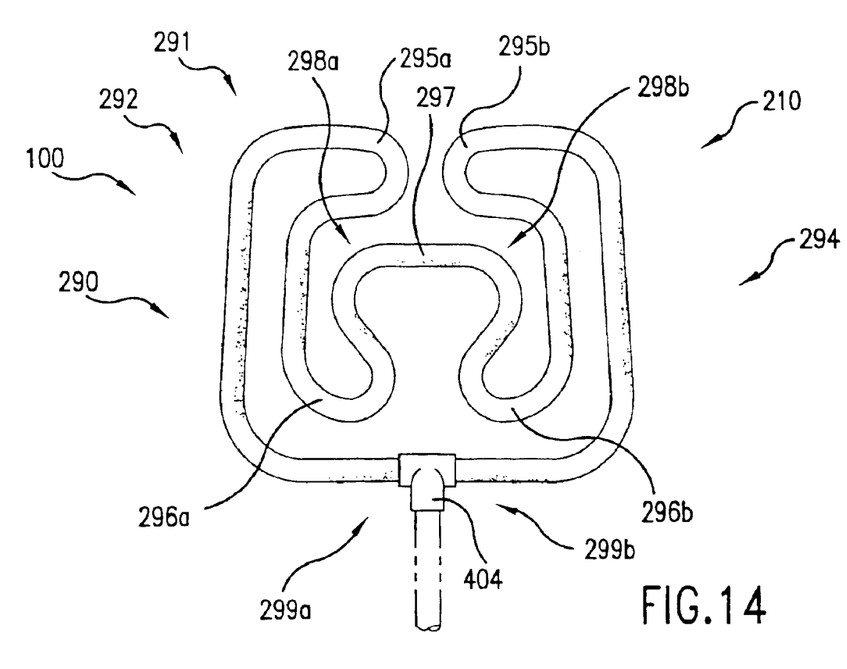

A non-cylindrical shape 210 is not cylindrical, i.e., a solid figure described by the edge of a rectangle rotated around the parallel edge of an axis where the ends of a cylinder are parallel at equal circles. Particularly, when viewing some embodiments of the fluidizer 100 as a whole, a non-cylindrical shaped fluidizer 100 does not have the shape of a cylinder, such as a pipe. Referring to FIGS. 1–5, non-cylindrical shapes 210 can include a cross 220, a helix 230, a curvature 240, an offset zig-zag 260, or a spiral funnel 270. With respect to the fluidizer 100 having a shape 200 resembling a curvature 240, such a curvature 240 can generally approximate a circle. However, the fluidizer of the present invention can take any shape 200, including cylindrical. However, a non-cylindrical shape that covers most of the opening and distributes gas uniformly within the particulate material is preferred. Two exemplary first and second symmetrically shaped fluidizers 280 and 290 are shown in FIGS. 13 and 14 with respective non-cylindrical shapes 210 and respective branch tee inlet connections. A preferred design would have symmetrical loops on both sides of the branch tee inlet connection.

With respect to the fluidizer 280 in FIG. 13, the fluidizer 280 can have a first symmetrical shape 281 with five loops and include a first half 282 and a second half 284. Each half 282 and 284 includes a respective first loop 285a–b and second loop 286a–b. The first loops 285a–b point generally in an opposite direction to the second loops 286a–b. The halves 282 and 284 at respective ends 288a–b join to form another loop 287. The other respective ends 289a–b of respective halves 282 and 284 connect to a branch tee inlet connection 402. Generally, the fluidizer 280 can be suitable for a round opening.

With respect to the fluidizer 290 in FIG. 14, the fluidizer 290 can have a first symmetrical shape 291 with five loops and include a first half 292 and a second half 294. Each half 292 and 294 includes a respective first loop 295a–b and second loop 296a–b. The first loops 295a–b point generally in a perpendicular direction to the second loops 296a–b. The halves 292 and 294 at respective ends 298a–b join to form another loop 297. The other respective ends 299a–b of respective halves 292 and 294 connect to a branch tee inlet connection 404. Generally, the fluidizer 280 can be suitable for a square or rectangular opening.

Referring again to FIG. 1, another embodiment of a fluidizer 100 may include a support 150 positioned at least partially within at least one wall 114 of the fluidizer 100 and of sufficient rigidity to provide a shape 200 to a fluidizer 100. Preferably, the support 150 may comprise a metal such as aluminum or iron. Preferably, the support 150 is in a form of a wire having a diameter of about 0.03 inch (0.07 cm). In this embodiment, the fluidizer 100 may include a flexible material 118, such as a plastic and preferably a thermoplastic. Most preferably, the thermoplastic is polytetrafluoroethylene. Generally, the polytetrafluoroethylene has a porosity of up to 50 microns, up to 40 microns, or of 0.5–10 microns. One preferred polytetrafluoroethylene may be obtained from Intermatic Polymer Engineering at 2445 W. Medtonic Way, Tempe, Ariz. 85281.

With respect to the ultra high molecular weight polyethylene, this material is relatively easy to shape to create a fluidizer 100 of a desired dimension for the desired application. Particularly, ultra high molecular weight polyethylene (UHMWP) can be heated to about 200° F. (93° C.) in order to shape it. Once the UHMWP is cooled, it will retain its shape.

Other polymers and plastics may be used as material 118 for a fluidizer 100. These materials include porous polymers or plastics, or porous metals.

Generally, the fluidizer 100 receives a gas 420 at pressures up to 30 psi (210,000 Pa), up to 5 psi (34,000 Pa), up to 3 psi (21,000 Pa), or 0.5 psi (3,500 Pa)–5 psi (34,000 Pa). The gas flow rate can be up to 30 SCFH (0.85 m3/hr), up to 5 SCFH (0.14 m3/hr), 1 SCFH (0.028 m3/hr)–5 SCFH (0.14 m3/hr), or 5 SCFH (0.14 m3/hr)–15 SCFH (0.42 m3/hr). However, this flow rate may depend on several other factors, such as the length of the fluidizer, its porosity, and the volume and density of the substance 360 being fluidized.

Optionally, the gas 420 entering the fluidizer 100 can be pretreated to remove potential contaminants. Such a pretreatment may include a membrane dryer and a submicron filter, or alternatively, a standard desiccant dryer and filter. Generally, it is desirable that the gas is dry before being introduced into the fluidizer 100.

The fluidizer 100 may be used in various environments depending on the material 118 that comprises it. As an example, if UHMWP is used as the material 118, generally the fluidizer 100 may be used at a temperature of up to about 180° F. (82° C.).

Figure 10:
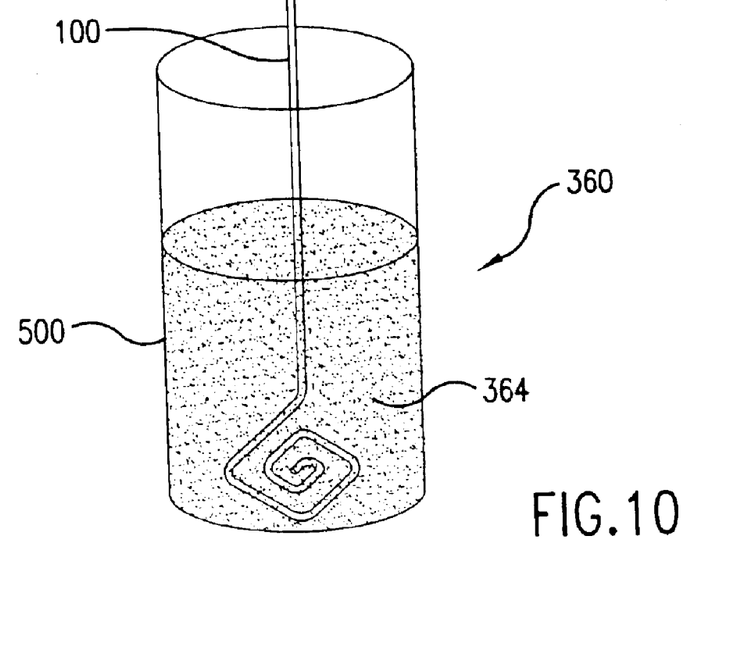
Figure 11:
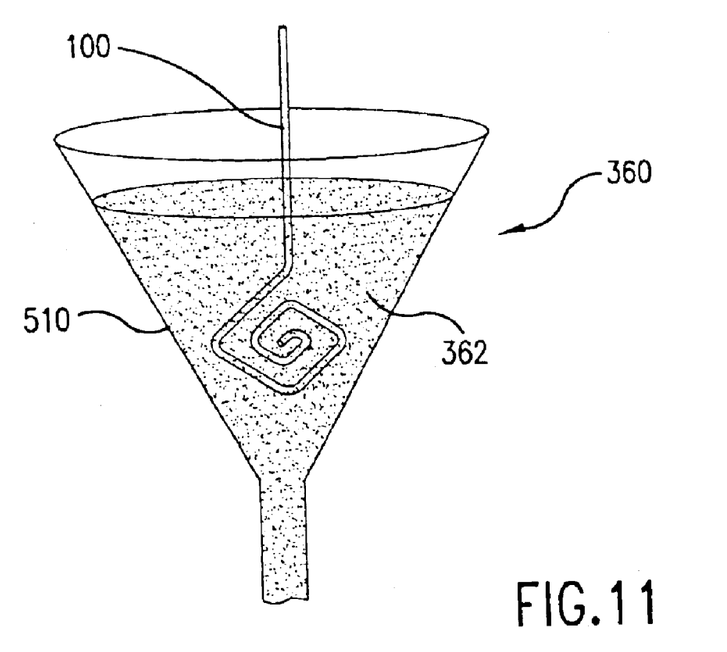
Figure 12:
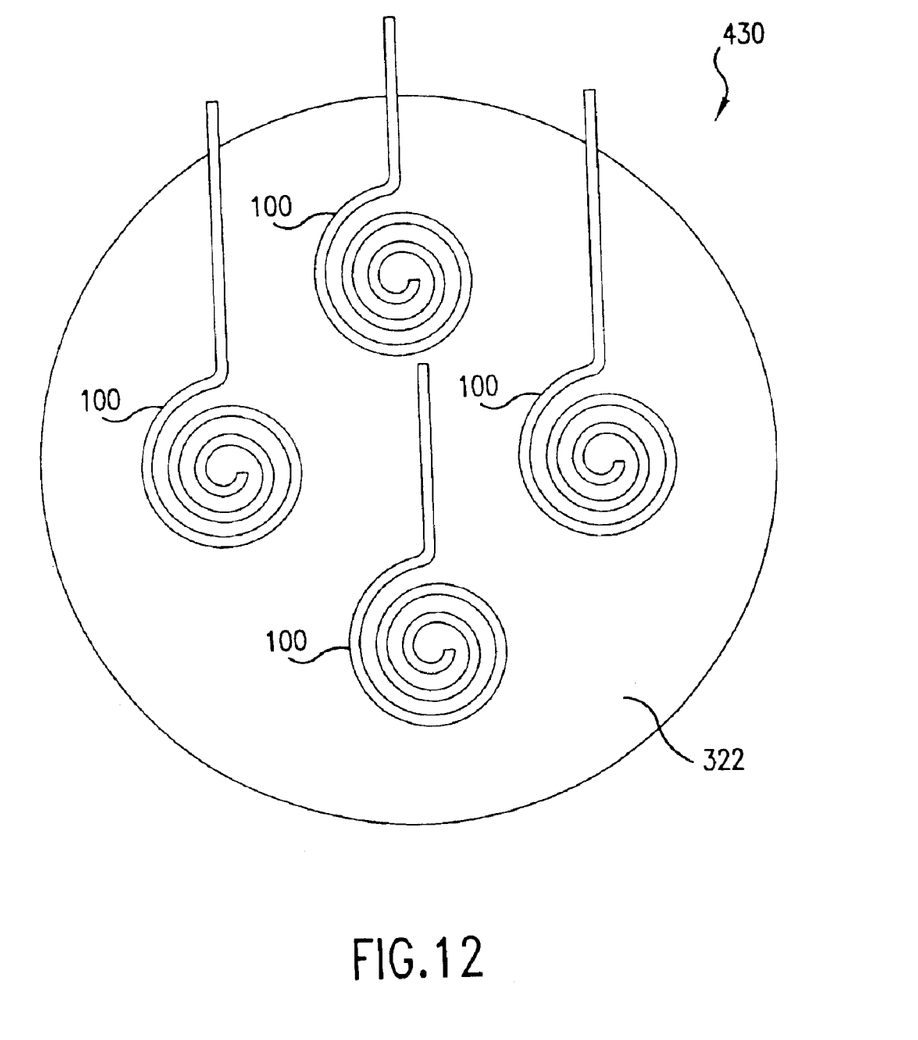

The fluidizer 100 may be used in a variety of applications, such as fill shoes, aquariums or in any application where a liquid or a particulate material needs fluidizing such as aeration. Referring to FIG. 10, one exemplary application for the fluidizer 100 is releasing a gas into a liquid, such as water, contained in a cylindrical container 500. The gas may be, for example, air. Furthermore, the substance 360, can be a liquid 364, such as water. Referring to FIG. 11, the fluidizer 100 may be inserted into a funnel container 510. A substance 360, such as a particulate substance 362, can be fluidized by a gas escaping from the fluidizer 100. This gas can be air or an inert gas, such as nitrogen or argon. Furthermore, FIG. 12, depicts a plurality 430 of fluidizers 100 positioned within an opening 322. Desirably, the fluidizers are positioned an equal distance from each other and the walls forming the opening 322 so as to provide a uniform distribution of the gas. In addition, it is generally desirable to place the fluidizer within an opening or a passageway to further facilitate the creation of a uniform distribution of the gas within the substance.

With respect to the different shapes of the fluidizer 100, a helical fluidizer 230 generally only requires gas input at one connection 410 as opposed to several connections that may be required by previous fluidizers. However, as the length of the helix increases, the uniformity of the gas being dispersed may be affected, which may lead to a non-uniform fluidization. Generally, uniform fluidization by the gas is preferred. In such cases, gas may be introduced at both ends of the helix 230 or both ends of the helix 230 as well as an orifice along its length. The fluidizer 100 may be any shape 200 as in, for example, FIGS. 2–5 and 13–14, but may take several forms, for example, a helix 230 in the case of a small opening or an offset zig-zag 260 in the case of a large opening. Also generally, a helix or other non-cylindrical shapes may be made from any material. A shape which is symmetrical about a tee connection is preferred, as shown in FIGS. 13 and 14.

Figure 6:
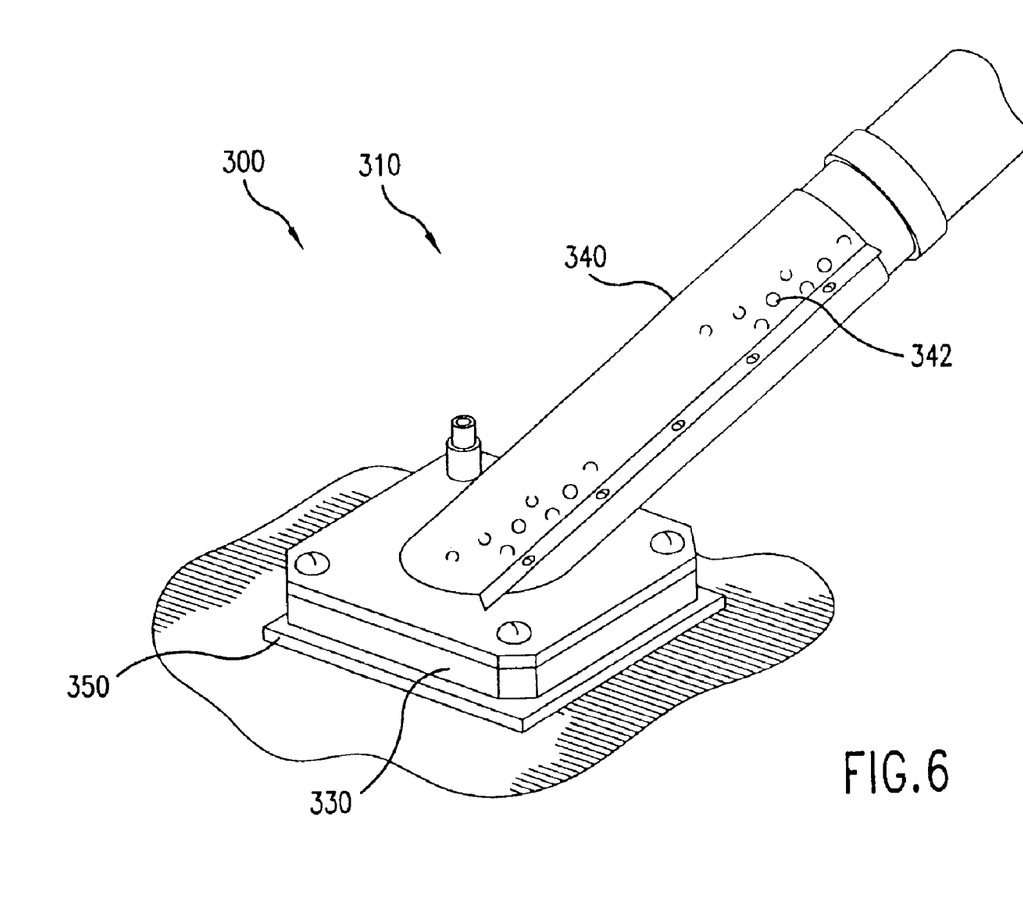

As discussed, a fluidizer 100 can be used in a variety of applications. Referring to FIGS. 6–7, one preferred application is an apparatus 300, such as a fill shoe 310, that may include a delivery chute 330, a delivery tube 340, and a bottom plate 350. Furthermore, the delivery tube may form vent holes 342. These vent holes 342 permit the escape of the gas 420 after it fluidizes the substance 360. This fill shoe 310 is substantially similar to the fill-shoe structure 76 disclosed in U.S. application Ser. No. 09/688,168, filed Oct. 16, 2000. The fill shoe 310 of the present invention may also include a fluidizer 100. Although the fill shoe 310 may include the fluidizing portion 10 of U.S. application Ser. No. 09/688,168 in addition to the fluidizer 100, preferably the fill shoe 310 only includes at least one fluidizer 100. Particularly, the fill shoe 310 preferably does not include a gas inlet port at the delivery tube 340. As depicted in FIG. 7, the substance 360, such as a particulate substance 362, flows substantially downward through the delivery tube 340 to the delivery chute 330. The fluidizer 100 provides a uniform distribution of the gas 420 to fluidize the particulate substance 362 as it passes through the bottom plate 350 and into a die cavity 380. Fluidizing the particulate substance 362 improves the filling of the cavity 380 with the particulate substance 362.

Generally, the pressure of the gas 420 used in the fluidizer 100 depends on the substance 360 being fluidized. As an example, metal powders typically used in the powder metallurgy industry often include lubricants and have relatively good flow characteristics. For these powders, the gas pressure applied is typically between about 1 psi (6900 Pa)–2 psi (1400 Pa) and rarely greater than about 5 psi (34,000 Pa). The pressure that is employed in any given instance depends upon not only the nature of the particulate material, but also the diameter of the flow tube and the length and porosity of the fluidizer 100. In any event, the pressure can be adjusted so that the gas 420 leaves through the vent holes 342 rather than flowing with the particulate substance 362.

Ceramic powders typically used in the ceramics industry are spray-dried and can also be characterized as having good flow characteristics. For these powders, the applied gas pressure is usually less than 3 psi (21,000 Pa) and typically closer to 1 psi (3,500 Pa).

For finer powders with poor flow characteristics, the magnitude of the applied gas pressure may be increased somewhat depending upon the powder characteristics, but again, care should be exercised to keep the applied gas pressure to the minimum that is necessary to accomplish proper filling and permitting the gas to escape through the vent screen.

The use of such low gas pressure also prevents powder segregation in the transport tube when using a powder mixture or alloy with a wide powder-size distribution; prevents the dusting of fine particles; and, discharges the particulates in a desirable stream. The use of too high a gas pressure, on the other hand, results in turbulence in the powder mass which causes powder segregation, dusting of fine particles, and a resulting low discharge volume of powder which can cause a malfunctioning of the delivery system.

Generally, the fill shoe 310 can be made of any suitable material, such as aluminum, stainless steel, or plastics such as plastic sold under the trademark Delerin® or Telfon® or a polycarbonate.

Figure 8:
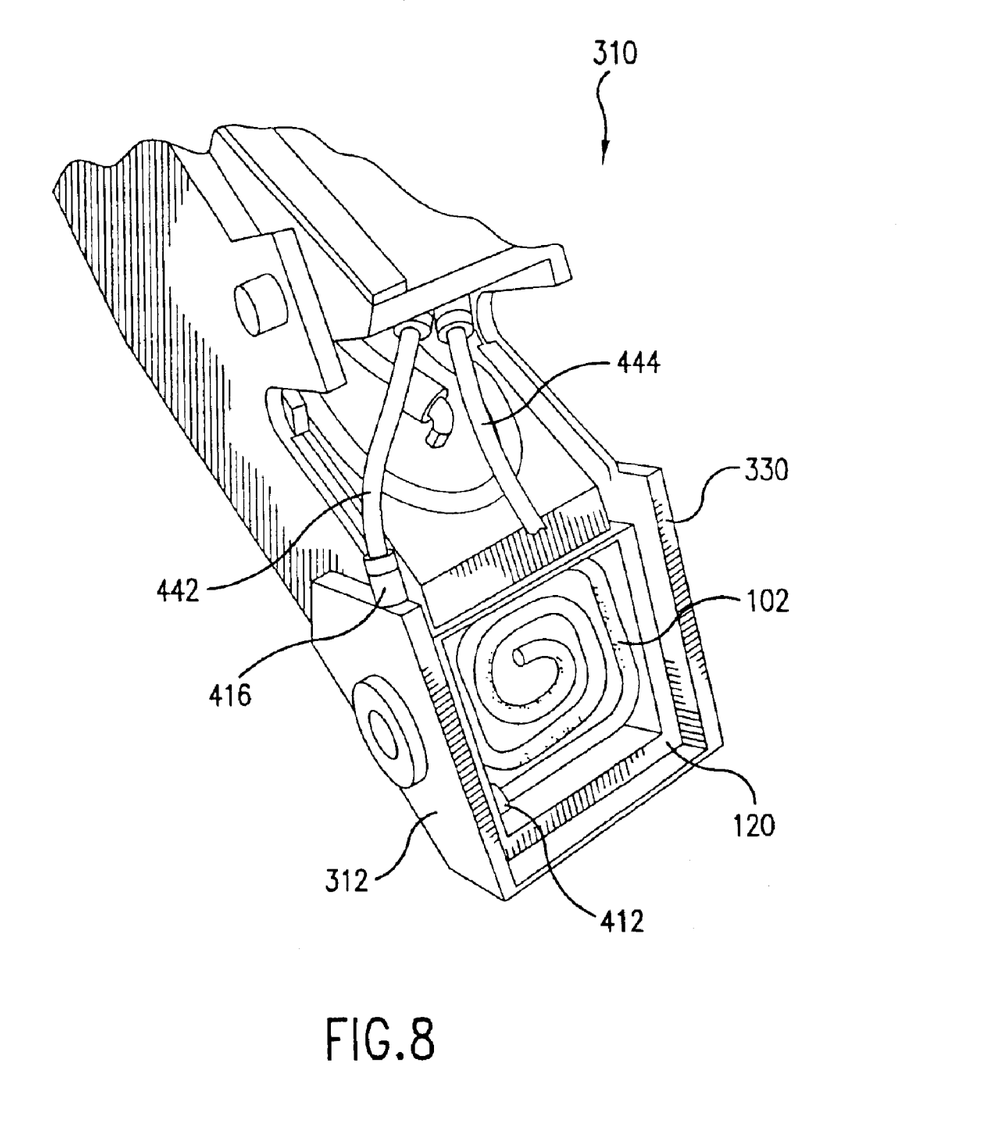
Figure 9:
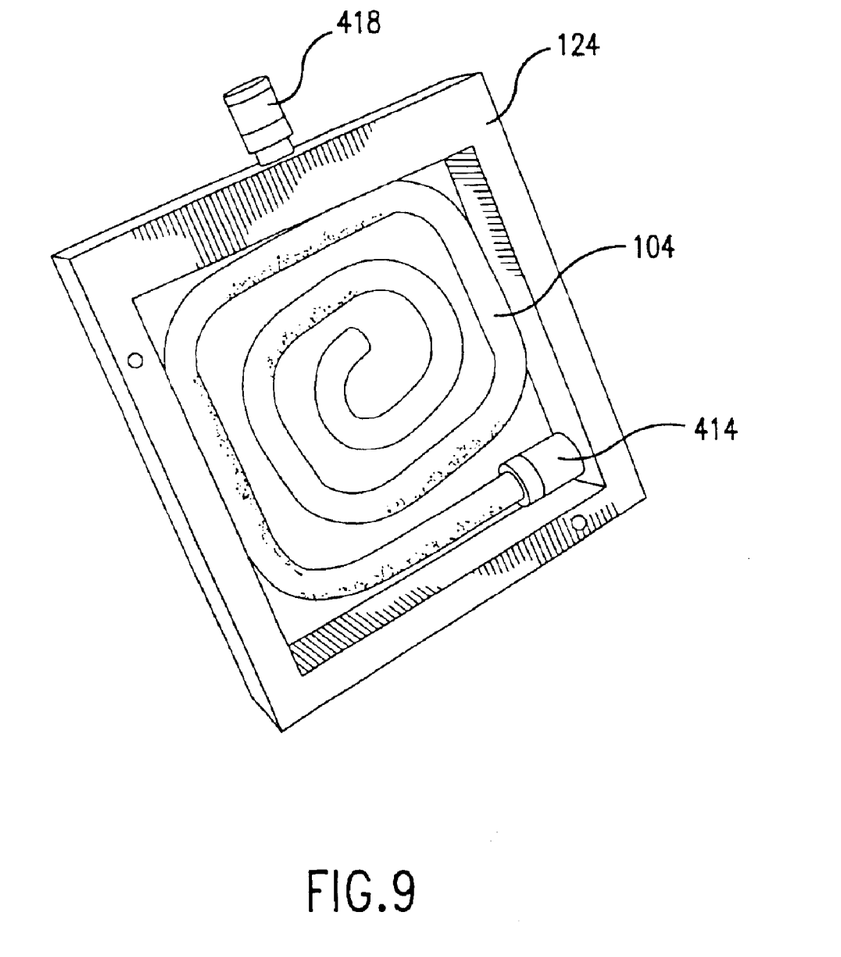

As discussed above, a plurality 430 of fluidizers 100 can be used for a particular application. Referring to FIGS. 8 and 9, in one particular fill shoe 310 application, two fluidizers 100, particularly, a first fluidizer 102 and a second fluidizer 104, may be incorporated, e.g. stacked vertically, into a delivery chute 330. Referring to FIG. 9, the first fluidizer 102, in this embodiment, may have a first connection 412 that fastens the first fluidizer 102 to a first frame 120, which is hollow. The first frame 120 has an opening (not shown) in a sidewall 312 of the fill shoe 310. The sidewall 312 forms a passageway to a first fastener 416, which in turn connects to a first adapter 442. Particularly, the gas 420 flows through the first adapter 442 and the fastener 416 into a passageway in the sidewall 312. From the sidewall 312, gas passes through the first connection 412 and into the first fluidizer 102. The gas then escapes from the first fluidizer 102 into the flowing substance 360 in the delivery chute 330. The gas then escapes through the vent holes 342 in the delivery tube 340.

Similarly, the second fluidizer 104, in this embodiment, may further include a second connection 414 fastened to a second frame 124. The second frame 124, which is hollow, further includes a second fastener 418. The second fastener 418 is connected to a second adapter 444 to permit the communication of the gas 420 with the second fluidizer 104. Particularly, gas 420 flows through the adapter 444 and the fastener 418 into the hollow second frame 124. The gas then enters the fluidizer 104 through the second connection 414. The gas then escapes through the fluidizer 100 into the surrounding environment to fluidize the substance 360. Likewise, the gas can escape through the vent holes 342 in the delivery tube 340.

Without further elaboration, it is believed that one skilled in the art can, using the preceding description, utilize the present invention to its fullest extent. The disclosed preferred embodiments are, therefore, to be construed as merely illustrative, and not limitative of the remainder of the disclosure in any way whatsoever.

In the foregoing, unless otherwise indicated, all temperatures are set forth uncorrected in degrees Celsius and all parts and percentages are by weight.

The entire disclosure of all cited applications, patents and publications, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a conveyor which conveys a particulate substance comprising a fill shoe outlet, a porous fluidizer in said fill shoe comprising non-cylindrical shape wherein the fluidizer comprises a body at least partially positioned within a flow of the particulate substance wherein at least some of the particulate substance flows around the body.

2. A fluidizer according to claim 1, wherein the fluidizer has a symmetrical shape about an inlet connection.

3. A fluidizer according to claim 1, wherein the non-cylindrical shape of the fluidizer is a cross, a helix, a curvature, a circle, an offset zig-zag, or a spiral-funnel.

4. A fluidizer according to claim 1, wherein the fluidizer as a whole has a non-cylindrical shape.

5. A fluidizer according to claim 4, wherein the non-cylindrical shape of the fluidizer is a cross, a helix, a curvature, a circle, an offset zig-zag, or a spiral-funnel.

6. A fluidizer according to claim 1, wherein the non-cylindrical shape of the fluidizer is a cross.

7. A fluidizer according to claim 1, wherein the non-cylindrical shape of the fluidizer is a helix.

8. A fluidizer according to claim 1, wherein the non-cylindrical shape of the fluidizer is a curvature.

9. A fluidizer according to claim 1, wherein the non-cylindrical shape of the fluidizer is a circle.

10. A fluidizer according to claim 1, wherein the non-cylindrical shape of the fluidizer is an offset zig-zag.

11. A fluidizer according to claim 1, wherein the non-cylindrical shape of the fluidizer is a spiral-funnel.

12. A fluidizer according to claim 4, wherein the non-cylindrical shape of the fluidizer is a cross.

13. A fluidizer according to claim 4, wherein the non-cylindrical shape of the fluidizer is a helix.

14. A fluidizer according to claim 4, wherein the non-cylindrical shape of the fluidizer is a curvature.

15. A fluidizer according to claim 4, wherein the non-cylindrical shape of the fluidizer is a circle.

16. A fluidizer according to claim 4, wherein the non-cylindrical shape of the fluidizer is an offset zig-zag.

17. A fluidizer according to claim 4, wherein the non-cylindrical shape of the fluidizer is a spiral-funnel.

* * * * *